United States Patent
Hall

[11] 3,807,357
[45] Apr. 30, 1974

[54] METHOD OF ASSEMBLING AN AQUARIUM

[75] Inventor: Frank Kenneth Hall, Saginaw, Mich.

[73] Assignee: O'Dell Manufacturing Inc., Saginaw, Mich.

[22] Filed: Apr. 10, 1973

[21] Appl. No.: 349,800

Related U.S. Application Data

[62] Division of Ser. No. 209,101, Dec. 17, 1971, Pat. No. 3,759,224.

[52] U.S. Cl. .................................................. 119/5
[51] Int. Cl. ............................................ A01k 64/00
[58] Field of Search ............... 119/5; 220/4 R, 83 R

[56] References Cited
UNITED STATES PATENTS

| | | | |
|---|---|---|---|
| 3,738,319 | 6/1973 | Dinnerstein | 119/5 |
| 3,721,366 | 3/1973 | Battershall et al. | 119/5 X |
| 3,677,433 | 7/1972 | Collins | 119/5 X |
| 3,167,051 | 1/1965 | Hovlid | 119/5 |
| 2,792,811 | 5/1957 | Di Chiaro | 119/5 |

*Primary Examiner*—Hugh R. Chamblee
*Attorney, Agent, or Firm*—Learman & McCulloch

[57] ABSTRACT

A method of constructing an aquarium with vertically spaced, unitary rigid top and bottom frames having perimetrically extending continuous open slots, and separate glass side panel sections to be sequentially received by one of the frames, wherein the frames themselves function as jigs during assembly, and afterward also function as jigs to hold the assembled aquarium in rigidly assembled disposition until the sealant used to assure a waterproof assembly can be cured in a curing step. The method includes the steps of: selecting one frame with a slot sized to snugly receive the glass panel sections and with opposing side wall sections bounding the slot of a depth to snugly receive and hold the glass sections in vertical disposition when the frame is disposed with its perimetrically extending slot up; inserting the edge portions of the separate glass sections in sequence snugly in the slot in flush facial engagement with said opposing side wall sections, and with their vertical edges in abutting lapped engagement to form a side enclosure, supported solely by the frame without need of auxiliary clamps; selecting another frame with a slot sized to snugly receive the glass panel sections, and placing the other frame over opposite edge portions of the inserted glass sections, with the slot in the latter frame snugly receiving the free edges thereof, so that it also vertically aligns the glass sections and functions with the first frame as a jig to hold the glass sections in vertical alignment and in butting engagement; and adhesively sealing the glass panel sections to provide a watertight enclosure.

10 Claims, 6 Drawing Figures

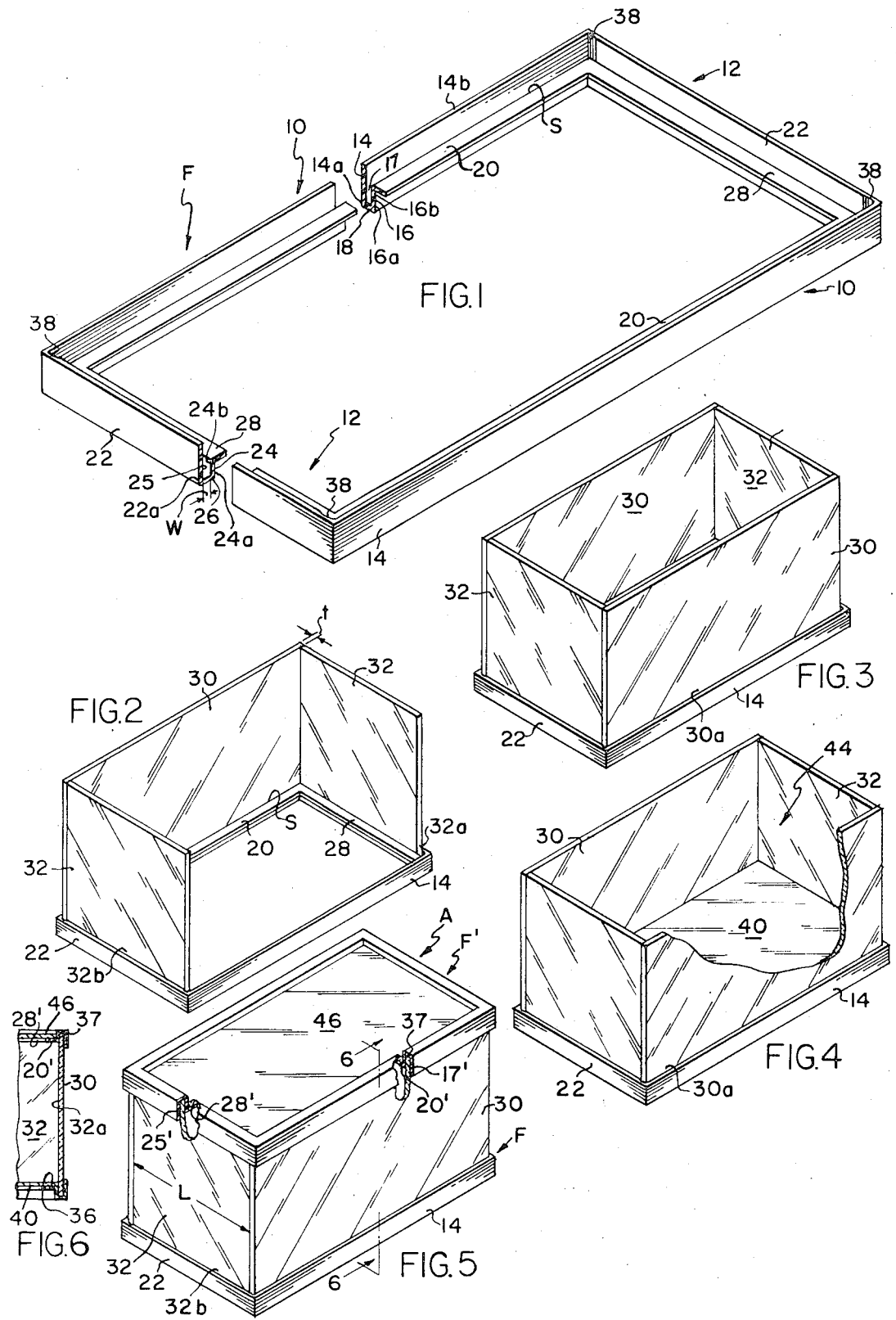

METHOD OF ASSEMBLING AN AQUARIUM

This is a division, of application Ser. No. 209,101, filed in the United States Patent Office on Dec. 17, 1971, now U.S. Pat. No. 3,759,224.

FIELD OF THE INVENTION

This invention relates to aquariums, and more particularly to a new and improved method of assembling an aquarium which does not require fixtures for retaining the walls during assembly.

BACKGROUND OF THE INVENTION

In the present day assembly of aquariums, some of the aquarium parts or components are generally held in a jig or fixture while other aquarium parts are being joined to them. Substantial manual labor is required to assemble the aquarium parts and to manipulate the retaining fixture. It is an object of the present invention to decrease the time required to assemble an aquarium.

It is yet another object of the present invention to provide a new and novel method of assembling an aquarium which does not use fixtures for retaining the various aquarium parts during assembly.

It is a further object of the present invention to provide an aquarium with a unitary side wall enveloping frame construction which may be selectively used as either the bottom frame member or the upper frame member.

It is a still further object of the present invention to minimize the overall cost of manufacturing an aquarium.

Other objects and advantages of the present invention will become apparent to those of ordinary skill in the art as the description thereof proceeds.

SUMMARY OF THE INVENTION

A method of constructing an aquarium with vertically spaced continuously integrally extending rigid top and bottom plastic frames having perimetrically extending continuous open slots to sequentially receive separate glass side panel sections to be enveloped by the frames wherein the frames selected function as jigs during sequential assembly of the separate glass side sections and afterward also function as jigs during the sealant curing step. The sequence employed may constitute insertion of first one side glass panel, then simultaneous insertion of two end glass panels with the end panel side edges abutting the side glass panel, and finally the insertion of the other side glass panel.

The present invention may more readily be described by reference to the accompanying drawings in which:

FIG. 1 is a top perspective view of an aquarium frame member constructed in accordance with the principles of the present invention, one side and one end of the frame member being split to more clearly illustrate the configuration of the outer and inner wall sections thereof;

FIG. 2 is a top, perspective view illustrating an initial step in assembling the aquarium wherein the side walls of the aquarium are vertically held by a lower frame member;

FIG. 3 is a top perspective view illustrating a subsequent step in assembling the aquarium, wherein the end wall members of the aquarium are vertically held by the lower frame between the side wall members of the aquarium;

FIG. 4 is a similar view illustrating a further step in the assembly wherein the lower wall of the aquarium is inserted and placed in position on the lower frame;

FIG. 5 is a perspective view of the assembled aquarium and also illustrates a further step in the assembly of the aquarium wherein the upper frame is placed over the top of the side and end walls of the aquarium; and FIG. 6 is a sectional end view taken along the line 6—6 of FIG. 5.

GENERAL DESCRIPTION

An aquarium constructed according to the present invention, is generally designated A (FIG. 5), and includes upper and lower frame members F' and F, transparent glass side walls 30 spanned by transparent glass end walls 32, a transparent bottom wall 40, and a transparent top wall 46. The frame members F and F' are identical and interchangeable and function in the assembly of the component parts in a manner which will later be described.

INTERCHANGEABLE FRAME MEMBERS

The injection molded plastic side wall enveloping frames F and F' are identical and accordingly only frame F will be described. Frame F comprises side and end frame portions generally designated 10 and 12 respectively, which are integrally formed to provide a unitary construction that facilitates rapid assembly of the aquarium A as will become apparent hereinafter. Each of the side portions 10 includes an outer vertical wall section 14 and an inner vertical wall section 16 spanned by a bridging wall section 18 to define an upwardly opening slot 17 for snugly receiving one of the aquarium glass side walls 30. Although the lower ends 14a and 16a of the outer and inner wall sections 14 and 16 are coterminus, the upper end 14b of the outer wall 14 terminates substantially above the upper end 16b of the inner wall 16. A bottom wall supporting flange 20 extends inwardly from the upper edge 16b of each inner wall 16 for supporting the lower transparent glass wall 40, as will be described more particularly hereinafter.

The end frame portions 12 each include an outer vertical wall section 22 and an inner vertical wall section 24, spanned by a horizontal bridging wall section 26, and defining an upwardly opening slot 25 in communication with the side slots 17 for receiving one of the aquarium glass end walls 32. The lower ends 22a and 24a of the outer and inner frame wall sections 22 and 24 are coterminus, however, the upper end 24b of the inner wall 24 terminates substantially below the upper end 22b of the outer wall 22. Extending inwardly from the upper end 24b of each inner wall 24 is an inwardly directed wall supporting flange 28 for supporting, with the flanges 20, the bottom glass wall 40 as will be described more particularly hereinafter.

The glass supporting walls 14, 16 and 18 of the side frame sections 10 are integrally formed with the glass supporting walls 22, 24 and 26, respectively, of the end frame sections 12 to provide enveloping walls defining a continuous aquarium wall-receiving slot, generally designated S, having side and end slot sections 17 and 25. The side and end, bottom glass wall supporting flanges 20 and 28 are also integrally formed.

The frames F and F' are particularly adapted for use in assembling the transparent, glass side walls 30 and end walls 32 which are respectively snugly received in the slots 17 and 25.

The glass side walls 30 are pre-cut sections which conventionally are cut to a 1/16 inch lengthwise tolerance. To account for this tolerance, the end wall members 12 each include a pair of vertical recesses 38, in longitudinal alignment with the aquarium wall-receiving side slots 17, for accommodating the ends 30a of the glass side walls 30 when necessary.

The length L of the glass end walls 32 is, for practical purposes, equal to the length of the inner end wall sections 24 and also equal to the distance between the glass side walls 30 received in the side slots 17. The glass end walls 32 may be cut from "pre-cut" glass sections conventionally cut to a one-sixteenth inch lengthwise tolerance. If the "pre-cut" sections 30 are then evenly cut into four end pieces 32, each piece will be of equal length within a tolerance of 1/64 of an inch. The thickness t of the glass end and side walls 32 and 30 is equal to the width w of the slots 17 and 25, so that the glass walls 30 and 32 are held tightly between the walls 14, 16 and 22, 24 respectively in a vertically disposed position. The bottom wall 40 of the aquarium A is supported on the inwardly disposed flanges 20 and 28 and has a length substantially equal to the distance between the aquarium end walls 32 received in the slots 25 and a width substantially equal to the distance between the glass side walls 30 received in the side slots 17. Full length, continuous beads 34 of conventional translucent, water impervious adhesive sealant, i.e., General Electric Company silicone cement RTV-108 are disposed between the adjacent side and end members 30 and 32 and full length, continuous beads of sealing cement 36 are also disposed between the wall members 30 and 32 and the adjacent wall sections 14 and 22, and the bottom wall 40 and the flanges 20 and 28, to provide a leak-proof chamber 44 in which water may be indefinitely held. No bead may be required between the edges of the bottom wall 40 and wall members 30 and 32, particularly in smaller size aquariums, but to assure a seal, such a bead may be used.

The identical frame F' is placed atop the glass side walls 30 and 32 so that the downwardly opening slots 25 and 17 receive the upper ends of the aquarium glass end walls 32 and side walls 30. Full length, continuous beads of suitable sealing compound or cement 37 are placed between the upper ends of the glass side and end walls 30 and 32 and the frame F' to provide a waterproof seal. The frame F' includes inwardly disposed flange portions 20' and 28' supporting a top glass wall 46 which provides a removable closure for the opening in the upper end of the aquarium.

THE METHOD OF ASSEMBLING THE AQUARIUM

The frames F and F' play an important role in the assembly of the aquarium A. The aquarium A is assembled by firstly running a bead of sealing cement 36 along the lower outer surface 30a of the glass side walls 30 and then placing one of the glass side walls 30 in the longitudinal slot 17 of the frame F in the position shown in FIG. 2. The glass wall supporting side wall section 10 of the frame F is sufficiently rigid to maintain the glass side wall 30 in the vertically true upright position illustrated in FIG. 2 without an auxiliary holding jig or fixture. A plurality of beads 34 of sealing cement are then run along the vertical marginal edges 32a and the lower outer edge surfaces 32b of the glass end walls 32 which are then placed in the slots 25, provided in the end sections 12 of the frame F, to abut the glass side wall 30 as illustrated in FIG. 2. Then the opposite side wall 30, which is provided with a like bead of cement 36 along its lower outer edge, is placed in the opposite slot 17 of frame F to abut end walls 32 (see FIG. 3). The end and side glass supporting wall sections 10 and 12 have sufficient rigidity and strength to maintain the snugly fitting glass side walls 30 and 32 in the structurally bonded vertically true, upright positions shown in FIG. 3 without use of any auxiliary positioning jig or form. A continuous perimetrical edge bead 36 of sealing cement is placed on the underside of the slightly undersize, (i.e., one-sixteenth of an inch all around to facilitate insertion) bottom glass wall 40 of the aquarium A before it is inserted through the opening in the upper end of the aquarium between the side and end glass walls 30 and 32 and moved downwardly to an adhesively secured position on the flange members 20 and 28 on the side and end frame members 10 and 12 (see FIG. 4).

The upper frame member F', which is as noted, identical to the lower frame F, but inverted relative thereto, is thence placed over the side walls 30 and 32 and moved downwardly relative thereto so that the upper ends of the side walls 30 and 32 are received in the slot portions 17' and 25'. Prior to moving the frame F' into position, a suitable adhesive 37 is placed on the upper outer edge surfaces of the glass walls 30 and 32 to structurally bond the frame F' thereto. The top closure glass wall 46 is then placed on the flange members 20 and 28 of the upper frame F' to complete the aquarium. The completed aquarium is then passed through an adhesive drying or curing oven to set the adhesive sealant and permanently glue the various components in permanent assembled relation. The frames F and F' are structurally bonded to the glass and operate, as a vise, to hold the glass walls together and as additional protection against stress otherwise causing leaks in the tank. When set, the sealant is somewhat elastic in quality and can deform without rupturing. Thus, with the so-called "floating" (undersize) bottom wall, the aquarium can be placed on a stand which is not entirely level and some relative change of position is possible without cracking the glass walls.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. A method of constructing an aquarium with vertically spaced, continuously integrally extending, synthetic plastic, unitary, rigid, top and bottom frames having perimetrically extending, continuous open slots therein bounded by opposing side wall sections, and separate glass side panel sections to be enveloped by the frames, comprising the step of placing a bottom panel section in position to close the bottom frame, and in addition, the steps of:

selecting one frame with a slot sized and shaped to snugly receive said glass panel sections, and with opposing side wall sections for said slot of a depth to snugly receive said glass panel sections and hold them in free standing vertical disposition when the frame is disposed with its perimetrically extending slot up;

placing said frame on a support surface with its said slot therein up;

sequentially inserting edge portions of separate glass sections snugly in said slot in said one frame in flush facial engagement with said opposing side wall sections, and with their vertical edges in abutting lapped engagement to form a side enclosure supported vertically in assembled disposition solely by the said one frame, without any auxiliary clamps or edge braces;

selecting another frame with a slot sized and shaped to snugly receive said glass panel sections;

placing the said other frame over opposite edge portions of said inserted glass sections with the slot in said other frame snugly receiving the said opposite edge portions thereof so that it functions with said one frame as a jig to hold the glass sections in alignment and butting engagement; and adhesively sealing said panel sections to provide a watertight enclosure.

2. The method of claim 1 including the step of disposing a perimetrally undersize bottom panel section between the lower ends of said side glass panel sections and in which said sealing step is partly accomplished by providing adhesive beads, which have elasticity when cured, between the adjacent glass side panel sections and between the bottom frame and the bottom wall panel section, and rigidly holding the side panel sections and bottom panel section together with the frames while the adhesive is curing to structurally bond said side and bottom panel sections.

3. The method set forth in claim 1 wherein certain of said glass side panel sections are formed by the steps of dividing a glass strip cut to a predetermined tolerance, into a predetermined number of equal length glass wall sections so that each is cut to a tolerance less than said predetermined tolerance.

4. The method set forth in claim 1 wherein said bottom aquarium frame member is rectangular and said slot therein is rectangular with side and end slot portions, and said inserting step is accomplished by inserting one glass side panel wall section in one of the said side slot portions, inserting two additional glass side panel wall sections in said end slot portions generally normal to said one side glass side panel wall section, and only thereafter inserting a fourth glass side panel section, generally parallel to said one wall section, in the other side slot portion in abutting engagement with said two additional side panel sections.

5. The method of claim 1 wherein said one frame is used as the bottom frame and said other frame as the top frame, and said bottom frame is centrally open and has inwardly projecting support flange means thereon, and said bottom panel section comprises a glass panel, inserted into the enclosure formed to rest on said support flange means, after the top frame is applied, which is sealed in position, with its edges abutting said glass sections, to form a watertight enclosure.

6. The method of claim 5 wherein said lower frame has a horizontally inwardly projecting flange and a sealant bead is applied to one of said flange and bottom panel prior to insertion of said bottom panel.

7. The method of claim 6 wherein said bead is placed continuously around the perimeter of said bottom glass panel on the bottom thereof, prior to insertion of said bottom glass panel.

8. The method of claim 1 wherein a sealant bead is applied to certain of the glass sections along certain vertically extending edges thereof to seal the side enclosure formed prior to insertion of each glass section to which sealant is applied.

9. The method of claim 8 wherein sealant beads are applied to one of said one frame and said glass sections prior to insertion of said glass sections in said one frame.

10. The method of claim 1 wherein the step of adhesively sealing includes curing over a time period without application of any clamps other than said frames to hold the parts in assembled condition.

* * * * *